United States Patent
Wang et al.

(10) Patent No.: US 6,330,170 B1
(45) Date of Patent: Dec. 11, 2001

(54) SOFT-SWITCHED QUASI-SINGLE-STAGE (QSS) BI-DIRECTIONAL INVERTER/CHARGER

(75) Inventors: Kunrong Wang, Johnson City, NY (US); Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 09/648,114

(22) Filed: Aug. 25, 2000

Related U.S. Application Data

(60) Provisional application No. 60/151,078, filed on Aug. 27, 1999.

(51) Int. Cl.[7] .................................................... H02M 5/45
(52) U.S. Cl. .............................................. 363/37; 363/17
(58) Field of Search ................................. 363/16, 17, 37, 363/41, 98, 132

(56) References Cited

U.S. PATENT DOCUMENTS 5,852,558 * 12/1998 Julian ..................................... 363/132
5,896,280 *  4/1999 Gucyski et al. ........................ 363/24

* cited by examiner

*Primary Examiner*—Peter S. Wong
*Assistant Examiner*—Gary L. Laxton
(74) *Attorney, Agent, or Firm*—McGuireWoods LLP

(57) ABSTRACT

A soft-switched single-phase quasi-single-stage (QSS) bi-directional inverter/charger converts AC-DC or DC-AC. The inverter/charger comprises a push-pull inverter/rectifier on the dc-side, an isolation transformer which provides ohmic isolation and voltage scaling, two full-bridges on the ac side in cascade, a voltage clamp branch comprising a capacitive energy storage element in series with an active switch with its anti-parallel diode, a passive filter at the ac side to smooth out the high frequency switching voltage ripple at the output, and a corresponding PWM scheme to seamlessly control the converter to operate in all four quadrant operation modes in the output voltage and output current plane, and is capable of converting power in both directions.

13 Claims, 19 Drawing Sheets

[t0 - t1]

[t1 - t2]

[t2 - t3]

[t3 - t4]

[t4 - t5]

[t5 - t6]

[t6 - t7]

[t7 - t8]

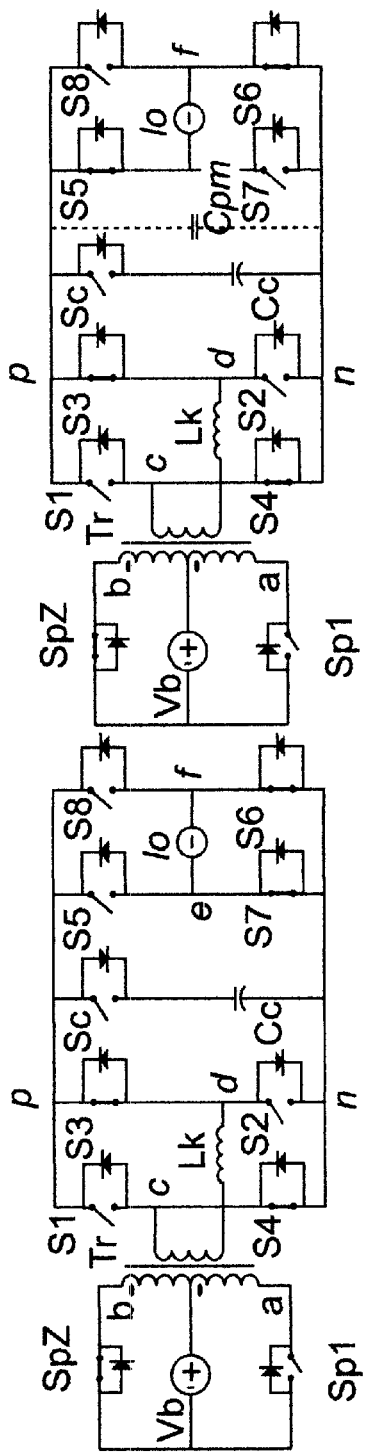
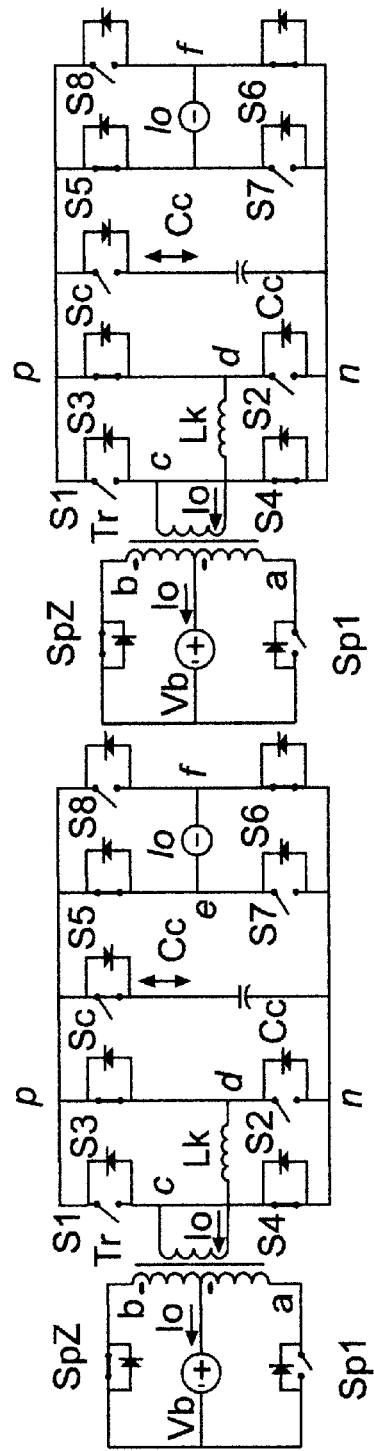
FIG. 11a [t0-t1]
FIG. 11b [t1-t2]
FIG. 11c [t2-t3]
FIG. 11d [t3-t4]

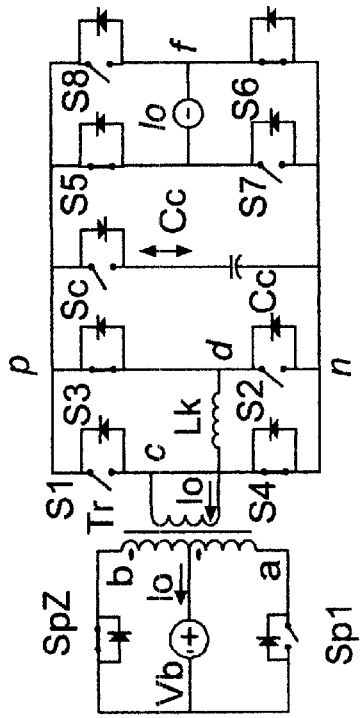
FIG. 11f [t5-t6]
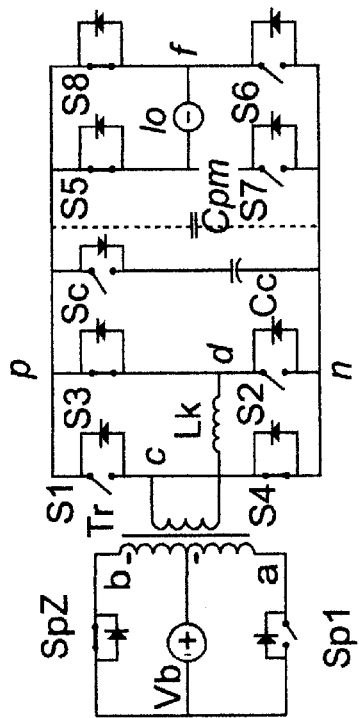
FIG. 11h [t7-t8]
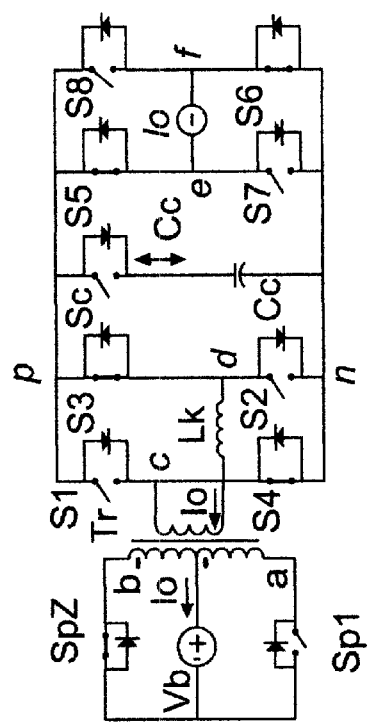
FIG. 11e [t4-t5]
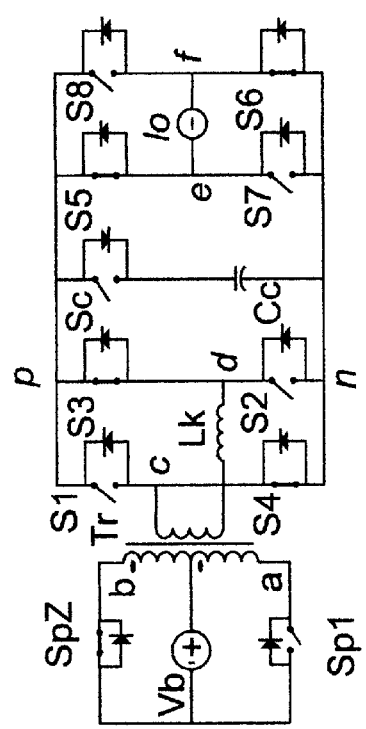
FIG. 11g [t6-t7]

SOFT-SWITCHED QUASI-SINGLE-STAGE (QSS) BI-DIRECTIONAL INVERTER/ CHARGER

CROSS REFERENCE TO RELATED APPLICATION

This application claims priority to U.S. Provisional Application Serial No. 60/151,078, filed on Aug. 27, 1999, herein in incorporated by reference.

BACKGROUND OF THE INVENTION

1. Field of the Invention

The present invention generally relates to a bidirectional power converter and, more particularly, to a cycloconverter which is capable of acting as both an inverter (converting DC power to AC power) and as a rectifier (converting AC power to DC power).

2. Description of the Prior Art

Bi-directional inverters/chargers are increasingly used in line-interactive uninterruptible power systems (UPSs), battery-backup stand-alone inverter systems, and alternative energy systems such as wind power and photovoltaic applications. A simplified block diagram of such a system is shown in FIG. 1. When voltage the bi-directional inverter/charger 2 functions as an inverter, it converts the dc voltage, $V_b$, into an ac output voltage, $V_0$, at line frequency to supply loads with various power factors. The dc source can be a low-voltage battery, or an alternative energy source with battery backup. Once the alternative ac source of $V_g$, which can be standalone engine-generator set 4, or a utility line, is available, it will be used to supply the load power 6 with the activation of the transfer switch 8, $S_t$, at the same time the bi-directional inverter/charger switches to charger operation to replenish the battery. An electromagnetic interference (EMI) filter 10 is also included. It is usually preferred for the converter to absorb sinusoidal current from the ac source when it operates as a charger to render better utilization of the available ac capacity.

The functions of such bi-directional inverter charger can be realized with a bi-directional dc/dc converter 12 in cascade with a four-quadrant full-bridge inverter/rectifier 14 as shown in FIG. 2A. A high-frequency (HF) transformer line $T_r$ is usually required to provide electrical isolation and voltage matching between the input dc and output ac voltages. In this kind of two-stage schemes, three HF inverters/rectifiers of either full-bridge, half-bridge or push-pull topology are needed and the power flow in either direction is always processed twice. In addition, extra dc-link filtering components are also a necessity.

In the past decade, single-stage, cycloconverter-based schemes as shown in FIG. 2B have constantly been sought. As shown, these comprise a high frequency inverter/rectifier 16 connected to a cycloconverter 18 through transformer $T_r$. The cycloconverter-based bi-directional inverter/charger topology was disclosed in U.S. Pat. No. 4,742,441 to Akerson, herein incorporated by reference. Since then, different pulse width modulation (PWM) control methods have been developed to either suppress the transient voltage in the cycloconverter part, achieve reliable four-quadrant operation, or improve the dynamic performance of the converter.

The concern about reliable bi-directional operation has been looming large for the cycloconverted-based single-stage inverters/chargers. It stems from two basic topological traits of the converter, i.e. the lack of self-present current freewheeling paths inside the cycloconverter because all of the switches are bi-directional and need control to activate in both directions, and the intrinsic transient voltage appearing on the cycloconverter switches during boost mode operation when power is transferred from the output (ac side) to the input (dc side). The former can be solved by the application of proper PWM sequence which ensure the existence of the output current freewheeling path while without shortening the transformer secondary winding. The latter is akin to any isolated boost-type of converters, and has to be solved with extra voltage clamping circuitry. One such example is shown in FIG. 3 using clamping circuitry. However, as discussed herein below, this arrangement has severe limitations which affect its performance and desirability.

SUMMARY OF THE INVENTION

A new self-switched single-phase quasi-single-stage (QSS) bi-directional inverter/charger topology is proposed for converting AC-DC or DC-AC. It features seamless four-quadrant operation in inverter mode, and rectifier operation with unity power factor in charger mode. Simple center-aligned PWM control, single-stage power conversion, standard half-bridge connection of devices, soft-switching (either ZCS or ZVS) for all the power devices, low conduction loss, and high efficiency are among its salient features. The circuit topology is derived from the cycloconverter-based circuit. A seamless center-aligned PWM and control are developed to smoothly control the converter in all of the operation modes. The proposed single-phase QSS inverter/charger topology is also extended to obtain topologies for other applications.

BRIEF DESCRIPTION OF THE DRAWINGS

The foregoing and other objects, aspects and advantages will be better understood from the following detailed description of a preferred embodiment of the invention with reference to the drawings, in which:

FIGS. 11A–H are equivalent circuits in a high-frequency cycle in quadrant II for timings [to–t1], [t1–t2], [t2–t3], [t3–t4], [t4–t5], [t5–t6], [t6–t7], and [t7–t8], respectively;

FIG. 15A is a circuit diagram of a full-bridge QSS inverter/charger;

FIG. 15B is a circuit diagram of a QSS inverter/charger with push-pull circuit for bridge I;

FIG. 15C is a circuit diagram three-phase QSS inverter/charger;

FIG. 16A is a circuit diagram of a single-phase boost PFC rectifier;

FIG. 16B is a circuit diagram equivalent single-phase boost PFC rectifier; and

FIG. 16C is a circuit diagram three-phase QSS boost rectifier.

DETAILED DESCRIPTION OF A PREFERRED EMBODIMENT OF THE INVENTION

Figure 1:
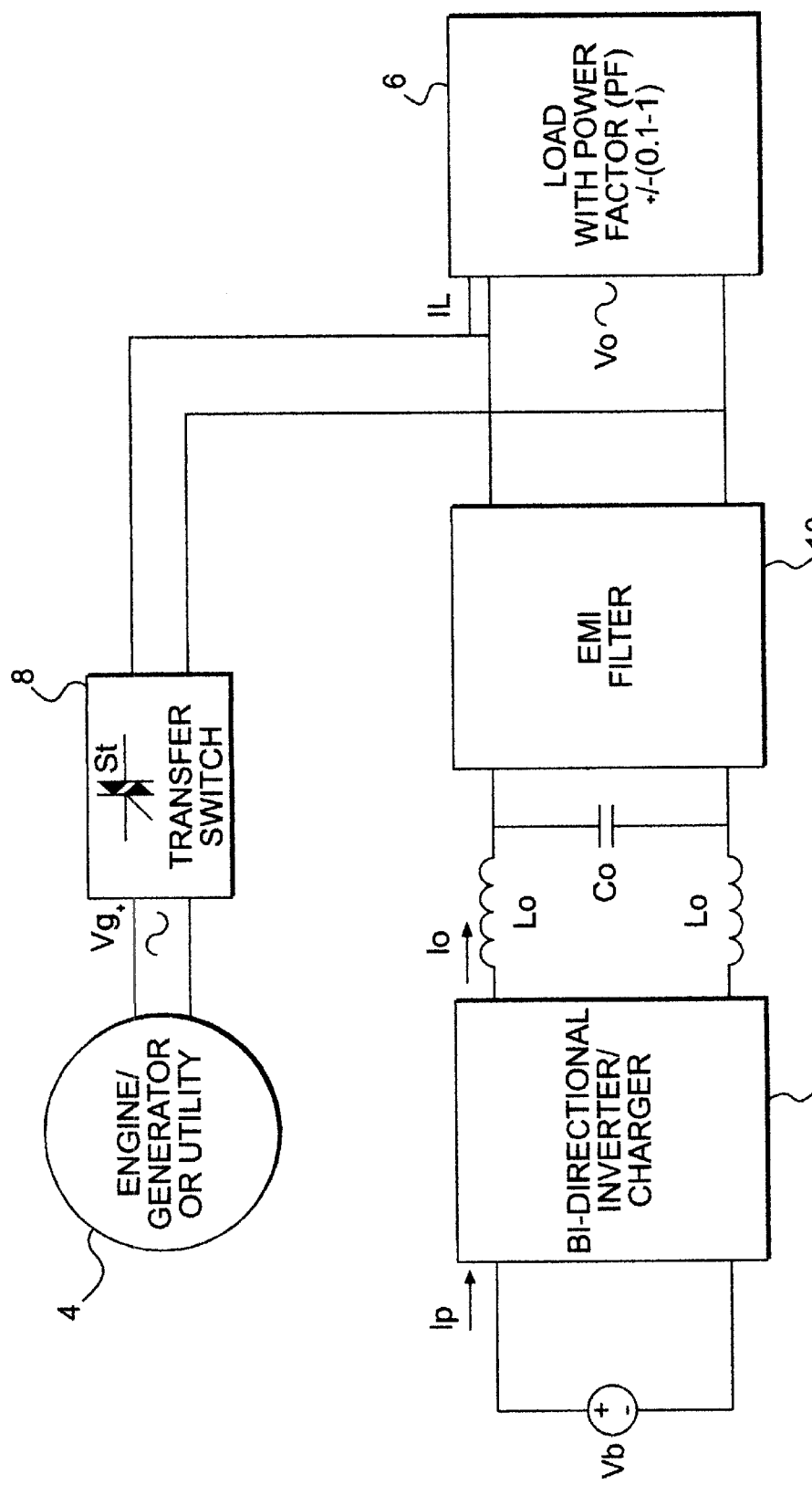
FIG. 1 is a block diagram of a typical inverter/charger system and line-interactive UPS.
Figure 2A:
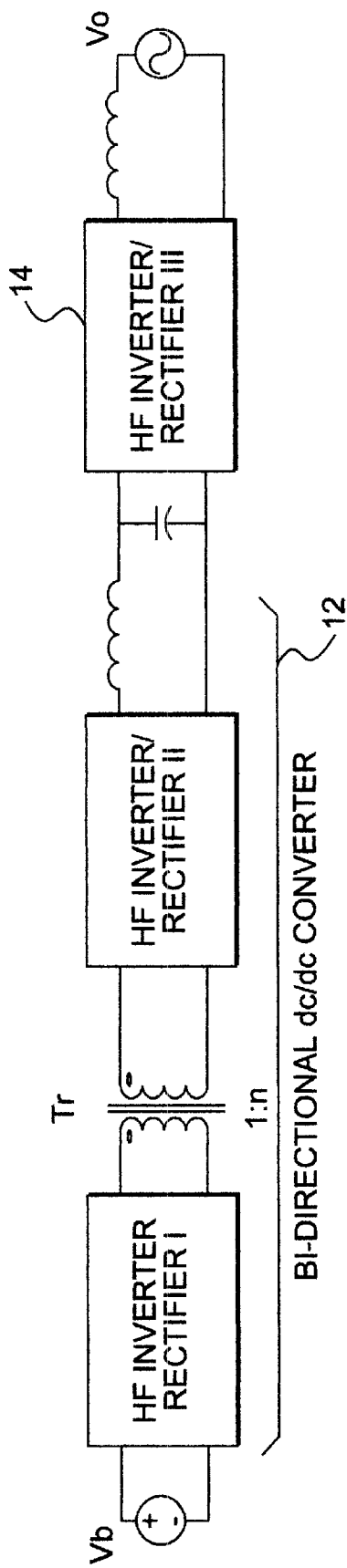
FIG. 2A is a block diagram of a typical bi-directional two-stage inverter/charger circuit.
Figure 2B:
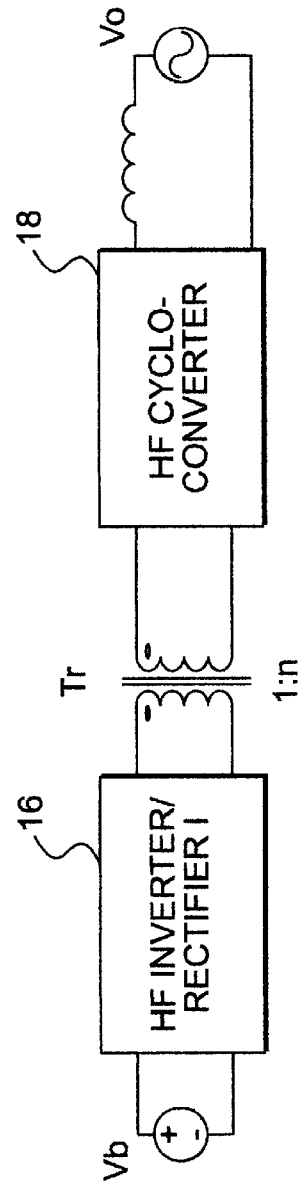
FIG. 2B is a block diagram of a typical bi-directional cycloconverter-based single-stage inverter/charger circuit.
Figure 3:
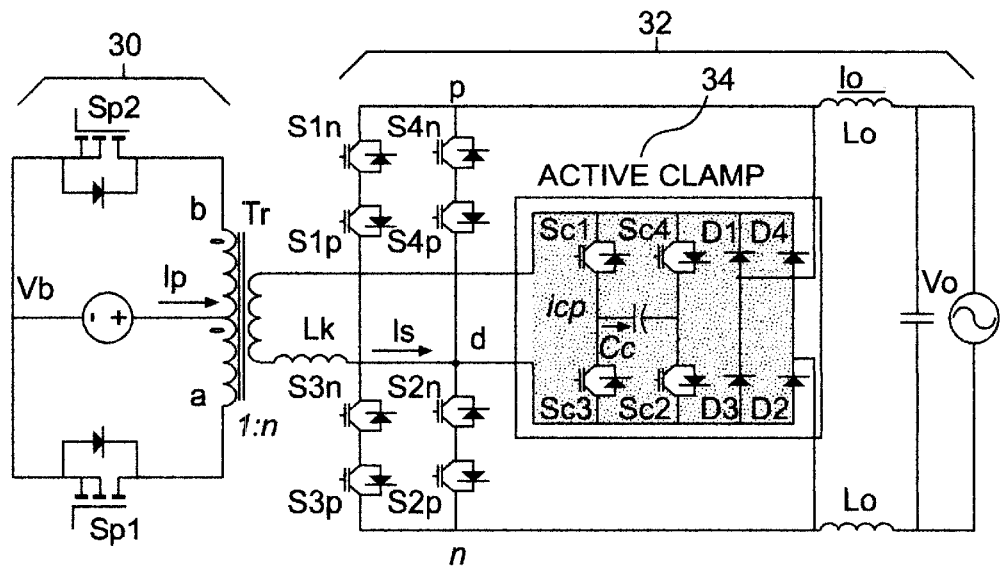
FIG. 3 is a circuit diagram of a bi-directional cycloconverter-based single-stage inverter/chargers with a bid-sectional active clamp.

To facilitate discussion and comparison, a prior art bi-directional cycloconverter-based single-stage inverter/chargers with a bi-directional active clamp is drawn in FIG. 3. Considering the fact that the dc side 30 is usually a low voltage, e.g. 12 V or 24 V, battery, a voltage-fed push-pull topology is justified; the ac side 32 voltage is usually much higher, e.g. 110 V or 220 V, a full-bridge cycloconverter can be used, especially in cases where the power level is relatively high. Because it is desired to achieve rectification with power factor correction (PFC) when the converter operates in charger mode, the output side has to be current-fed to achieve the required boost action.

The bi-directional active clamp circuit 34 consists of four active switches, $S_{C1}$–$S_{C4}$, four directing diodes, $D_1$–$D_4$, and a clamp capacitor, $C_C$. Coupled with suitable PWM scheme, it can suppress the otherwise high transient voltage in the cycloconverter and achieve secure operation. However, some severe shortcomings exist in this circuit topology. They include: non-standard device connection in the cycloconverter which deters the use of standard half-bridge modules, high conduction loss on the output side including the clamp circuit, complicated active clamp circuitry 34 and corresponding floating drives, and complicated PWM pattern.

Figure 4A:
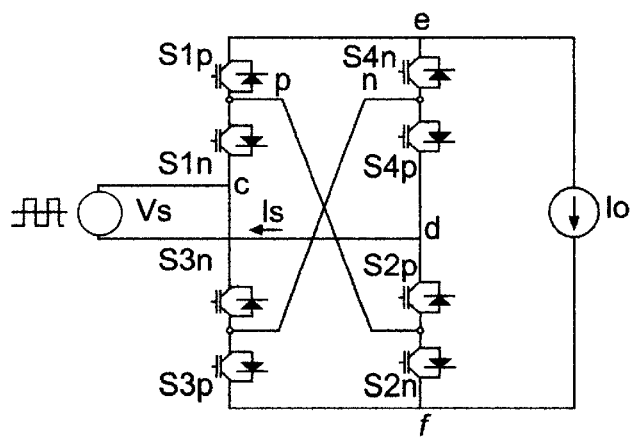
FIG. 4A is the topological evolution of the proposed soft-switched QSS bi-directional inverter/charger with the addition of extra conduction paths.

Scrutiny into the cycloconverter topology shown in FIG. 3 reveals the fact that shortcut freewheeling paths can be created for the output inductor current, $I_O$. As illustrated in FIG. 4A where the voltage across the secondary side of the transformer, $V_S$, is represented by a square pulsating waveform, and the output inductor current, $I_O$, by a current source, by adding two extra conduction paths in the converter labeled as p and n, the output current can now freewheel through only one switch and one diode instead of two switches and two diodes, thus halving the freewheeling conduction loss. Moreover, this is achieved without affecting the capability for syntheses of the output voltage, $V_{ef}$.

Figure 4B:
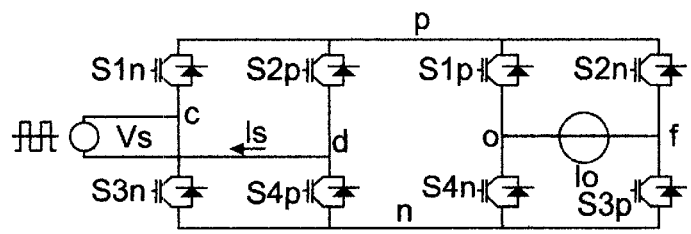
FIG. 4B is the QSS bi-directional inverter/charger shown in FIG. 4A stretched and redrawn.

The circuit can be easily stretched along the created paths p and n, and redrawn as shown in FIG. 4B. It is apparent that the new topology is not only functionally compatible with the original cycloconverter, but also has the standard half-bridge device connection. Because it takes the shape of two full-bridges without the intermediate filtering components while preserving the basic traits of single-stage power processing, it is named as "quasi-single-stage" (QSS) topology.

In the proposed QSS inverter/charger, the voltage across the new buses p and n becomes unidirectional. As a result, the transient voltage clamp circuitry can be greatly simplified.

Figure 5:
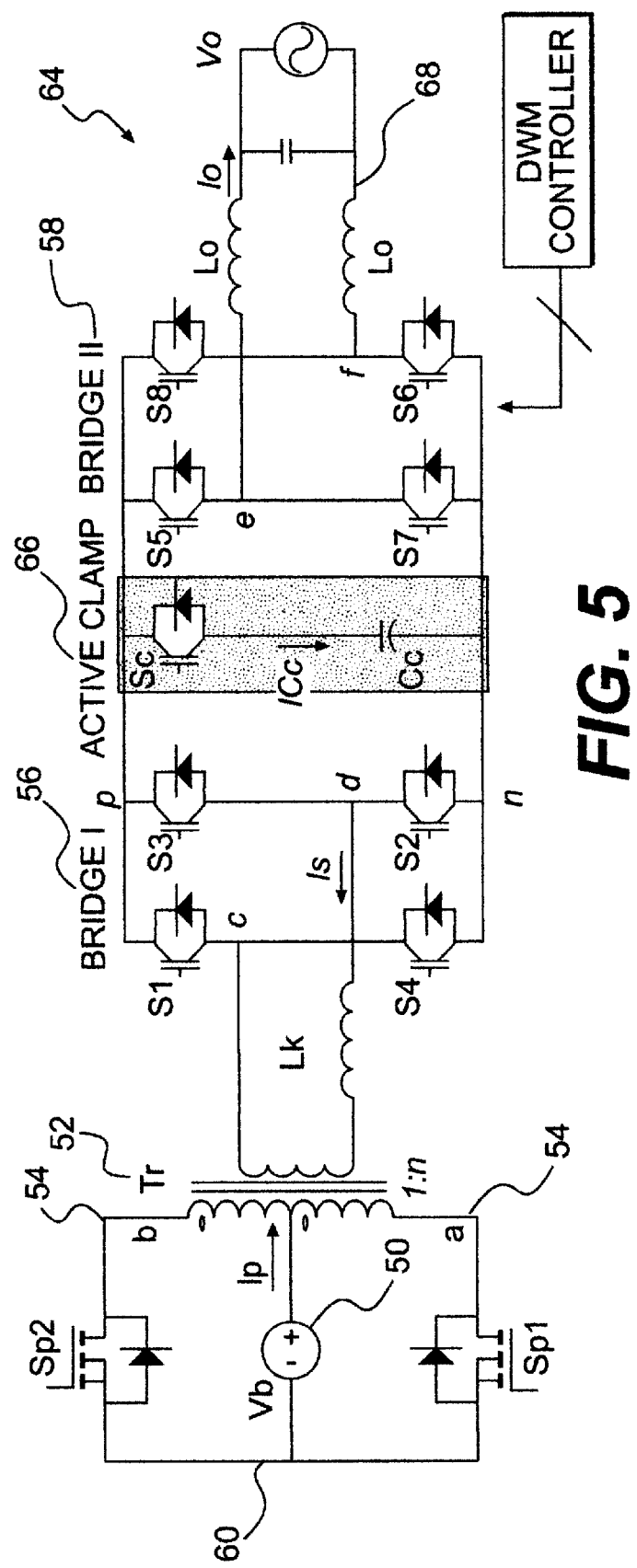
FIG. 5 is a circuit diagram of a soft-switched QSS bi-directional inverter/charger with a simplified active clamp.
Figure 6A:
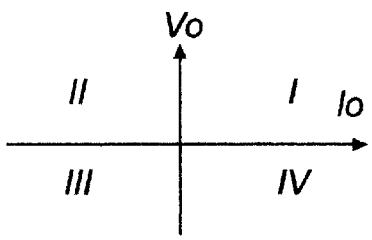
FIG. 6A is a graph showing four-quadrant operation in the Vo-Io plane.
Figure 6B:
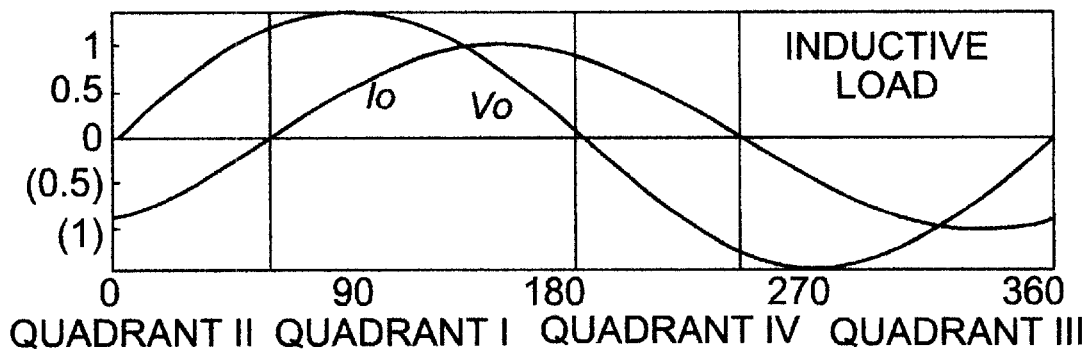
FIGS. 6B–C are graphs showing four quadrant operation in inverter mode and in charger (PFC) mode, respectively.
Figure 6C:
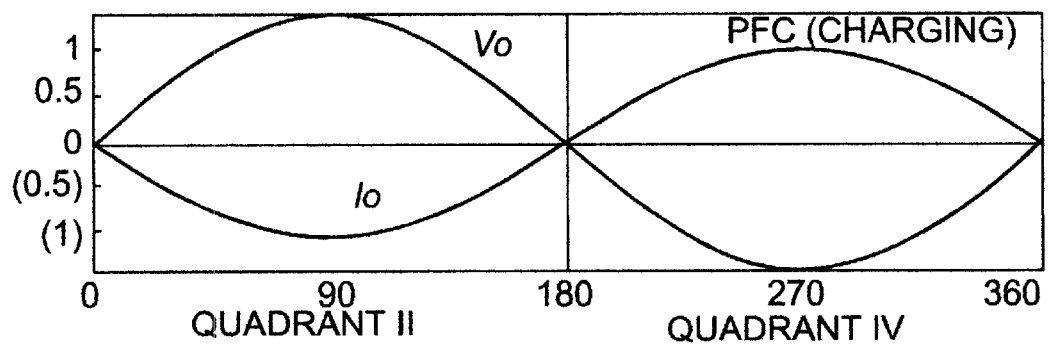

Referring to FIG. 5, the QSS inverter/charger according to the present invention is shown. A dc element 50 (e.g. a battery or an alternative energy source such as a wind turbine, or a solar array) is connected to the primary side center tap of a transformer ($T_r$) 52 and two high current switches $SP_1$ and $SP_2$ are connected to either transformer end taps 54. On the secondary side, pairs of switches divided into two separate bridges, Bridge I (56) and Bridge II (58). Switches $S_1$–$S_4$ and $S_5$–$S_8$ and are alternately connected to a high line (n) and a low line (p). An alternating current AC is then induced across inductor terminals Lo connected to the second bridge 58. In this embodiment the QSS inverter/charger comprises a push-pull inverter/rectifier on the dc-side 60, an isolation transformer 52 which provides ohmic isolation and voltage scaling, two full-bridges 56 and 58 on the ac side 64 in cascade, a voltage clamp branch 66 comprising a capacitive energy storage element $C_C$ in series with an active switch $S_C$ with its anti-parallel diode, and a passive filter 68 at the ac output to smooth out the high frequency switching voltage ripple at the output. As shown in FIG. 5 only one switch, $S_C$, is needed for the active clamp branch.

From the discussion below, it will be shown that the PWM pattern can also be greatly simplified, and seamless control for four-quadrant operation can be easily realized with the proposed QSS inverter/charger. With the proposed center-aligned PWM pattern, soft-switching can be achieved for all the main power devices.

As discussed above, the proposed QSS bi-directional inverter/charger has the following salient features compared to other existing circuit topologies furnishing the same functionality:

Reduced freewheeling conduction loss;
Standard half-bridge circuit connection;
Easier circuit layout;
Much simplified voltage clamp circuit;
Reduced loss in voltage clamp circuit;
Soft-switching for all the power devices;
Simplified PWM pattern and control;
Seamless four-quadrant operation.

Referring to FIGS. 5–12, the high-frequency operation principles of the QSS inverter/charger in each operation mode will be discussed. In inverter mode, because the load can assume any power factor, either leading or lagging, the circuit needs to operate in all four quadrants in the $V_O$–$I_O$ plane during an output line cycle as indicated in FIGS. 6A and 6B. So it is important to develop a seamless PWM pattern which ensures smooth transition between different quadrants. In charger mode, the circuit only needs to operating in quadrant II and IV, as shown in FIG. 6C.

In the following analysis, it assumed that all the power devices are ideal, and their output capacitance is represented by a lump capacitor $C_{pn}$ (not shown in most of the drawings) across the buses p and n; the inductance of the output filter, $L_O$, is much higher than the leakage inductance of the transformer seen from the output side, $L_k$, so that the output current $I_O$ can be considered constant during circuit commutations. The clamp capacitor $C_C$ is temporarily assumed large enough such that the variation of its voltage during a high-frequency cycle can be neglected to facilitate the analysis.

Inverter Mode Operation

In inverter mode, the circuit shown in FIG. 5 operates in quadrants 3 and 4 and are an exact replica of those quadrant 1 and 2 except that the PWM signals for the two pairs of diagonal switches in bridge II are swapped. So, only operations in quadrant 1 and 2 need to be considered.

To secure transitions between different operating quadrants, a basic invariant PWM pattern which is valid for all operation conditions is highly preferred. In this section, a center-aligned PWM scheme is developed to seamlessly control the QSS inverter/charger. All the necessary switch signals are derived from a simple PWM modulator which uses a triangular carrier. With this PWM scheme, the commutations for the primary push-pull circuit 60 and the first bridge, bridge I (56) as indicated in FIG. 5, are always separated from that in the output bridge, bridge II (58), and always take place when the ac load current is freewheeling in the output bridge. Consequently, all these commutations are lossless because no current needs to be switched. Moreover, 50% fixed duty-cycles are applied to all the switches in the primary side and bridge I, so the primary push-pull circuit and bridge I on the secondary side basically function as a dc transformer, which translates the voltage levels on both sides, while the sole objective of the commutations is to maintain the flux balance of the transformer. Real PWM signals are directed only to the output bridge together with the clamp switch.

Quadrant I: Inversion or Buck Operation

In quadrant I, both the load current and the required output voltage, $V_O$, which is derived from the feedback control loops, are positive, and power is transferred from the battery side to the output ac side.

In order for the primary side and bridge I (56) to achieve lossless switching, it is mandatory to reset the transformer leakage current to zero during the freewheeling period of the output current. It can be shown that depending on the timing of the active clamp switch Sc relative to the main switches in bridge II (58), different schemes are possible. Next, two of such schemes will be illustrated, with one discussed in more detail.

Figure 7:
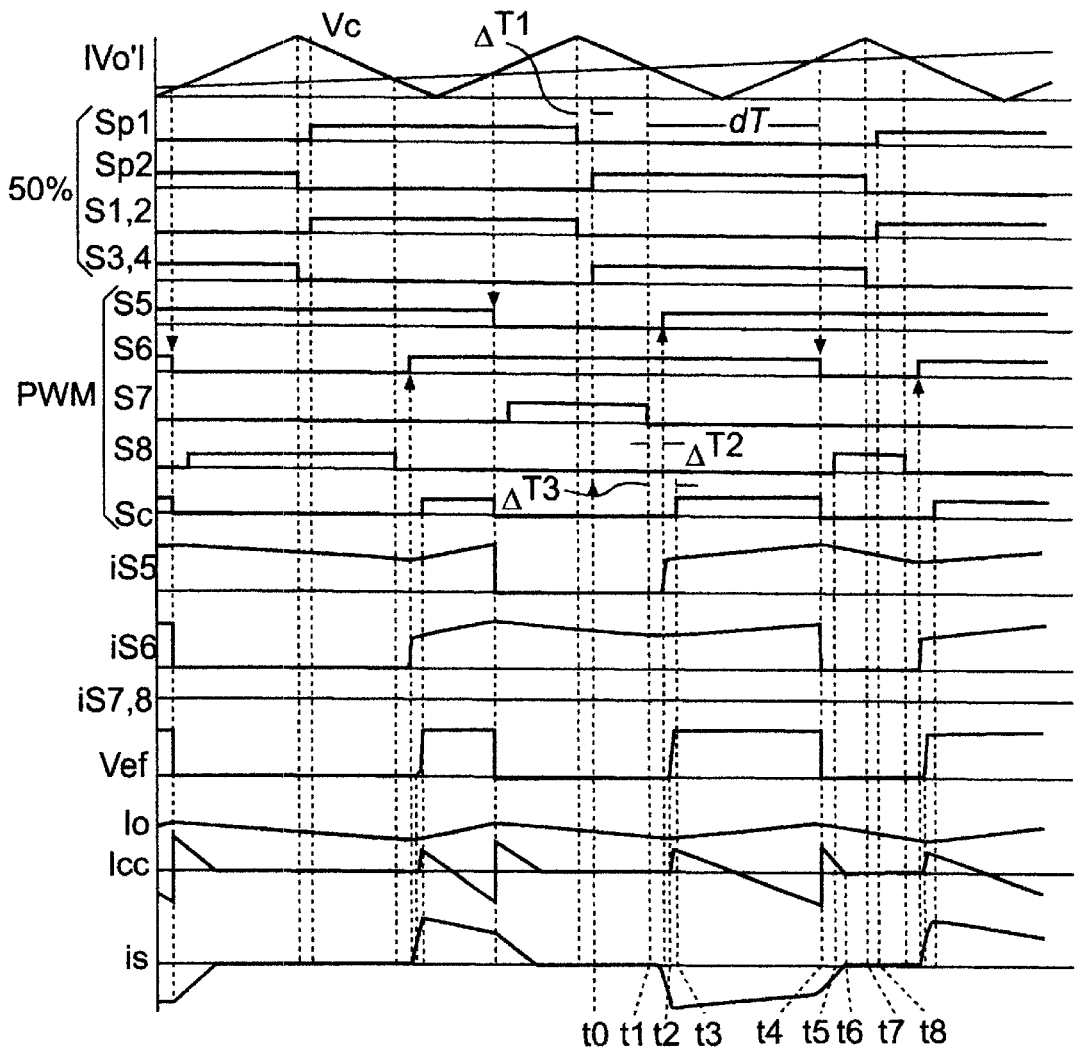
FIG. 7 is a PWM pattern and key waveforms in quadrant I.

One such PWM pattern is shown in FIG. 7 for operation in quadrant I. It is apparent that the control signal for the clamp switch $S_C$ coincides with the output voltage pulse and is the direct output from the PWM modulator with a proper turn-on delay. The equivalent active circuits in each interval within a half high-frequency cycle are drawn in FIGS. 8A–H as discussed below.

Figure 8A:
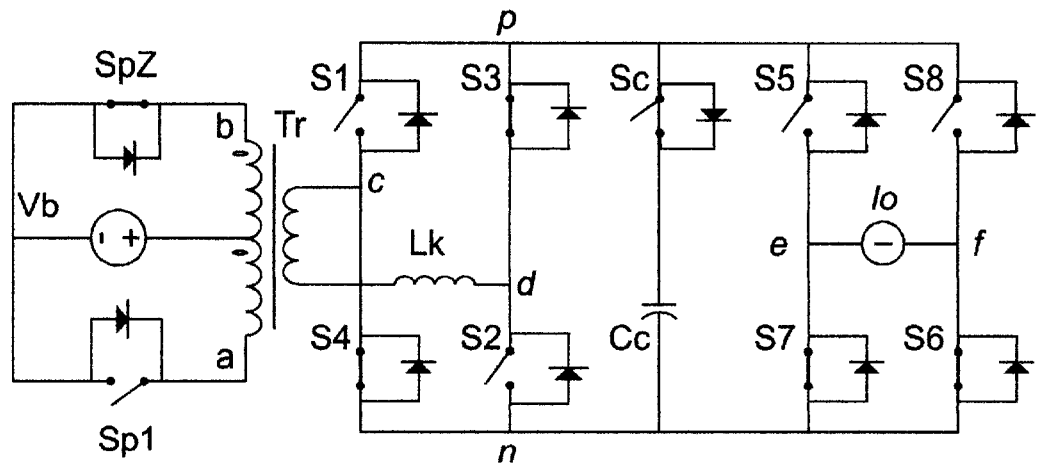
FIGS. 8A–H are equivalent circuits in a high-frequency cycle in quadrant I for [t0–t1], [t1–t2], [t2–t3], [t3–t4], [t4–t5], [t5–t6], [t6–t7] and [t7–t8], respectively.

Referring to FIG. 8A, at time $[t_0-t_1]$ assume that a PWM cycle begins with the peak of the PWM carrier, then the switches on the primary side 60 and bridge I 56 reconnect at the beginning and in the middle of a PWM cycle, and is synchronized with the triangular carrier. At $t_0$, $S_{p2}$, $S_2$ and $S_4$ are closed under zero current, while the load current is freewheeling through $S_6$ and the antiparallel diode of $S_7$, $D_7$.

Figure 8B:
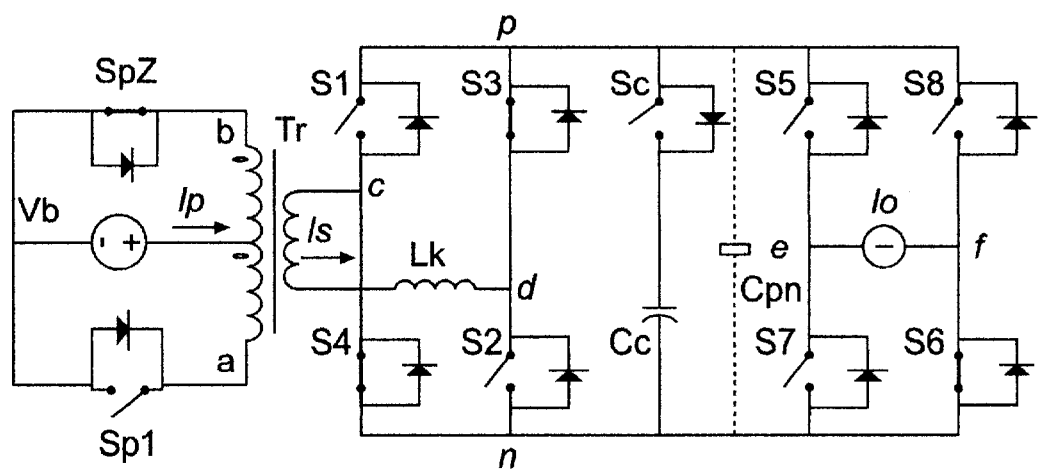

Referring to FIG. 8B, for [t1–t2], at $t_1-\Delta^{T2}$, where $\Delta^{T2}$ is the dead time between the half-bridge switches, $S_7$ is turned-off without interrupting the circuit operation because in quadrant I, the positive load current can only flow through its diode. At $t_1$, $S_5$ in bridge II 58 is turned on, and $I_O$ discharges the parasitic capacitance across the bus, $C_{pn}$ to bring the bus voltage $V_{pn}$ quickly up to the clamp capacitor voltage $V_{Cc}$ and the bus voltage is clamped to $V_{Cc}$, and the bus voltage decays to zero immediately. At the same time, the battery voltages exerted on the transformer leakage inductance $L_k$, and the transformer secondary current $I_8$ starts to ramp up. It should be mentioned that because of the existence of $L_k$, $I_{S5}$ can only rise in finite rate determined by n $V_b/L_k$, where n is the turns ratio of the transformer as defined in FIG. 5. So the turn-on loss of $S_5$ is very low although it is not strictly ZVS (zero voltage switching).

Figure 8C:
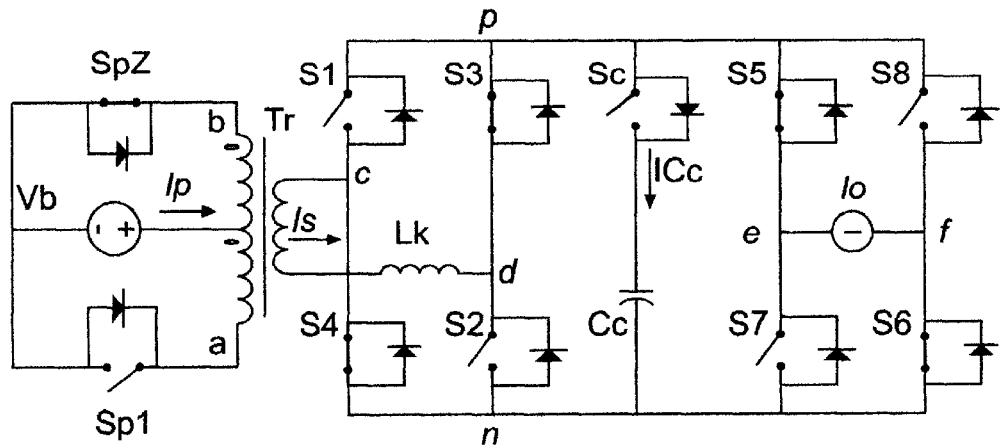

Referring to FIG. 8C at time $[t_2-t_3]$: $I_3$ reaches the load current level at $t_2$, and after that, $L_k$ resonates with $C_{pn}$ to bring the buss voltage $V_{pn}$ quickly up to the clamp capacitor voltage $V_{Cc}$, and the bus voltage is clamped to $V_{Cc}$. The resonation between $L_k$ and $C_C$ charges energy into $C_C$.

Figure 8D:
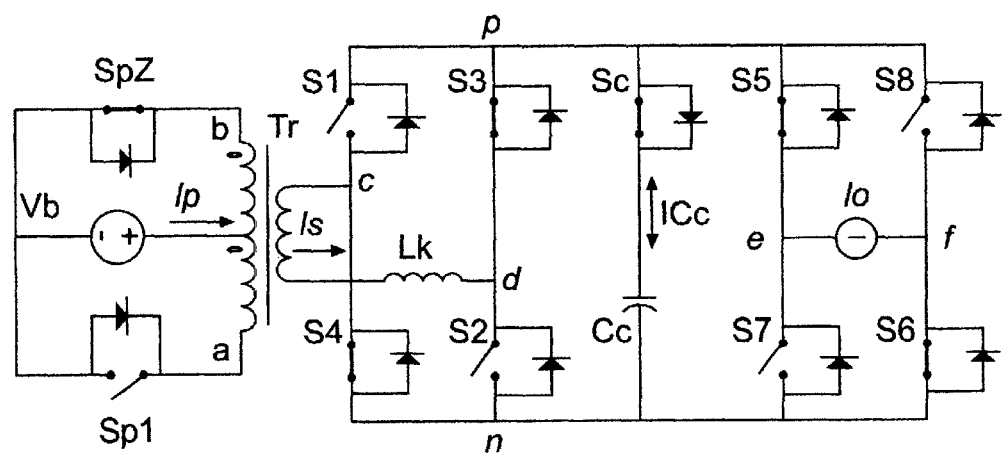

Referring to FIG. 8D, at time $[t_3-t_4]$: After a delay time of $\Delta T_3$ from the turn-off of $S_7$, $S_C$ is turned on under zero voltage. The resonance between $L_k$ and $C_C$ continues. Finally $I_{CC}$ reverses its direction, and the energy charged into $C_C$ is dumped to the output. During this interval, the amplitude of $I_8$ keeps decreasing.

Figure 8E:
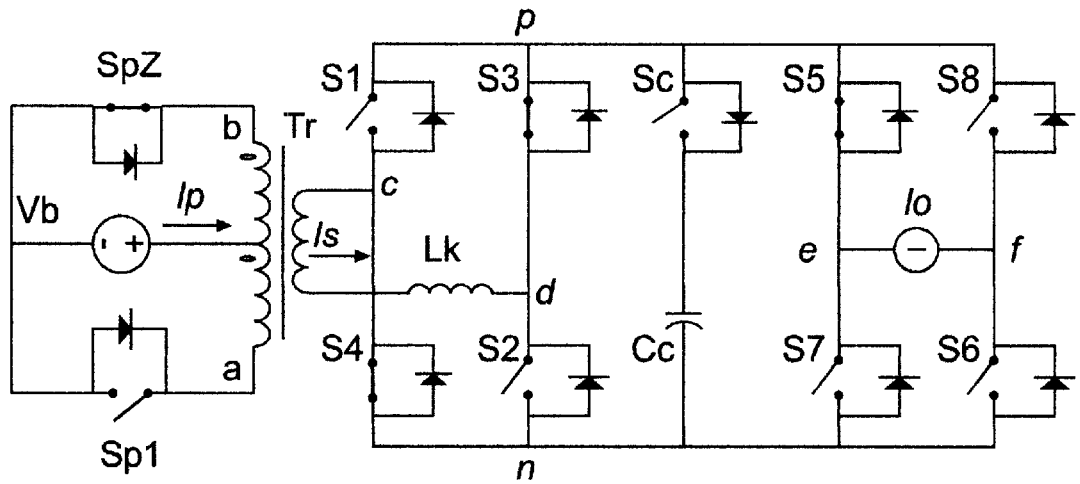

Referring to FIG. 8E, at time $[t_4-t_5]$, both $S_C$ and $S_6$ are turned off at $t_4$, ending the on duty cycle. $I_O$ freewheels through $S_5$ and $D_8$. Once $S_5$ is off, $I_{CC}$ immediately reverse its direction and the remaining transformer leakage energy charges $C_C$ and $L_k$ is reset.

Figure 8F:
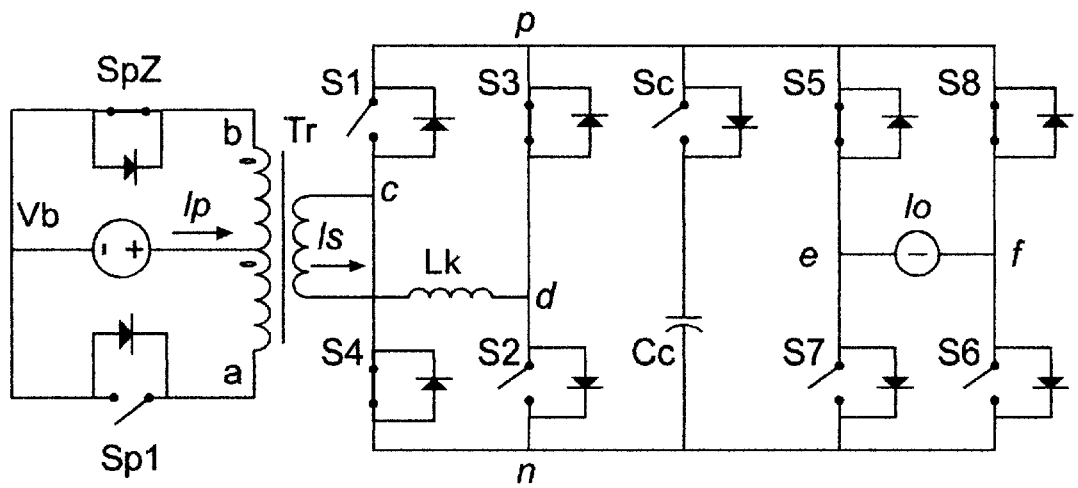

Referring to FIG. 8F, at time $[t_5-t_6]$, at $t_5$, $S_8$ is turned on without any interruption to the circuit operation because its diode $D_5$ is freewheeling the load current.

Figure 8G:
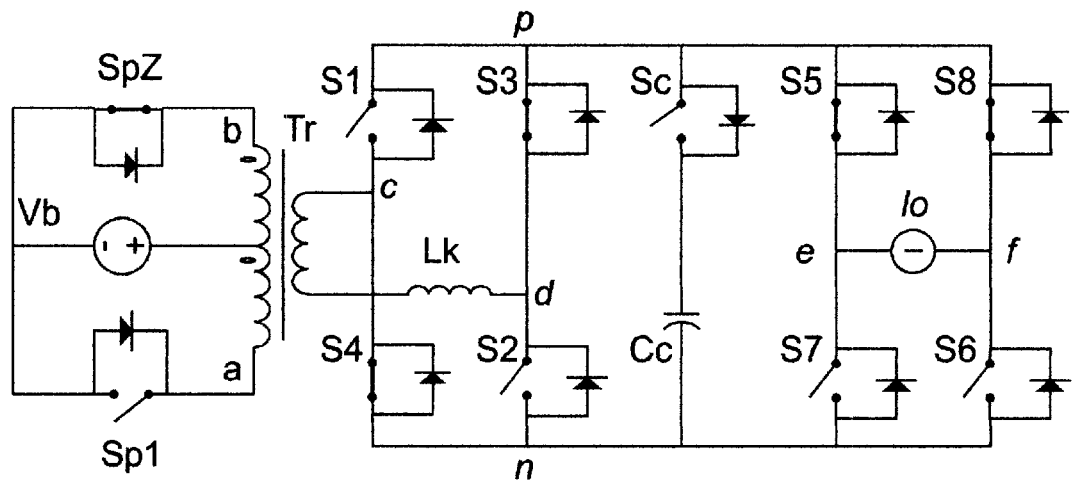

Referring to FIG. 8G, at time $[t_6-t_7]$, $I_8$ resets to zero at $t_6$, and keeps quiescent. The only active part of the circuit is $S_8$ and $D_8$ which freewheel the output current.

Figure 8H:
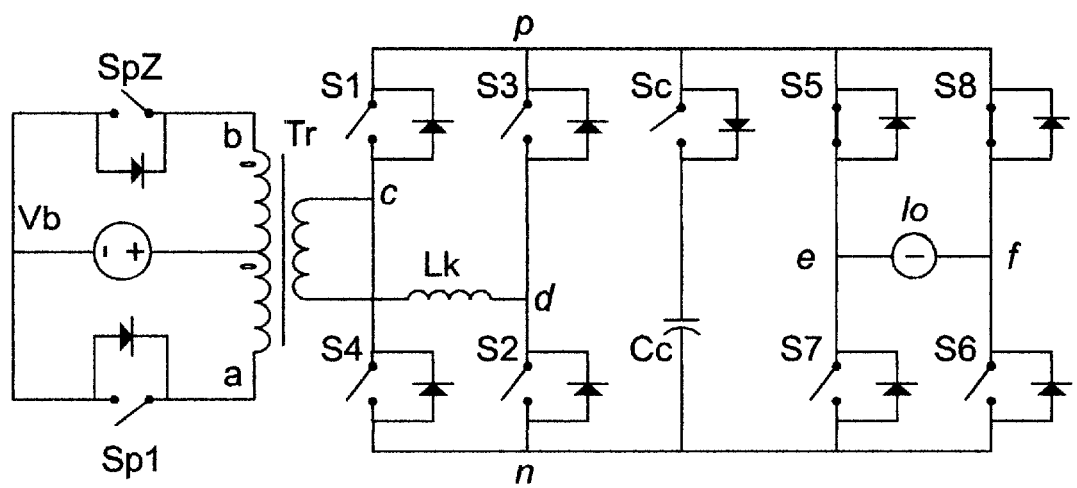

Finally, referring to FIG. 8H, at time $[t_7-t_8]$: At $t_7$, the primary side and bridge I start to commutate with $S_{p2}$, $S_8$ and $S_4$ turned off under zero current. At $t_8$, the other half switching cycle is initiated with the complimentary switches being active.

Figure 9:
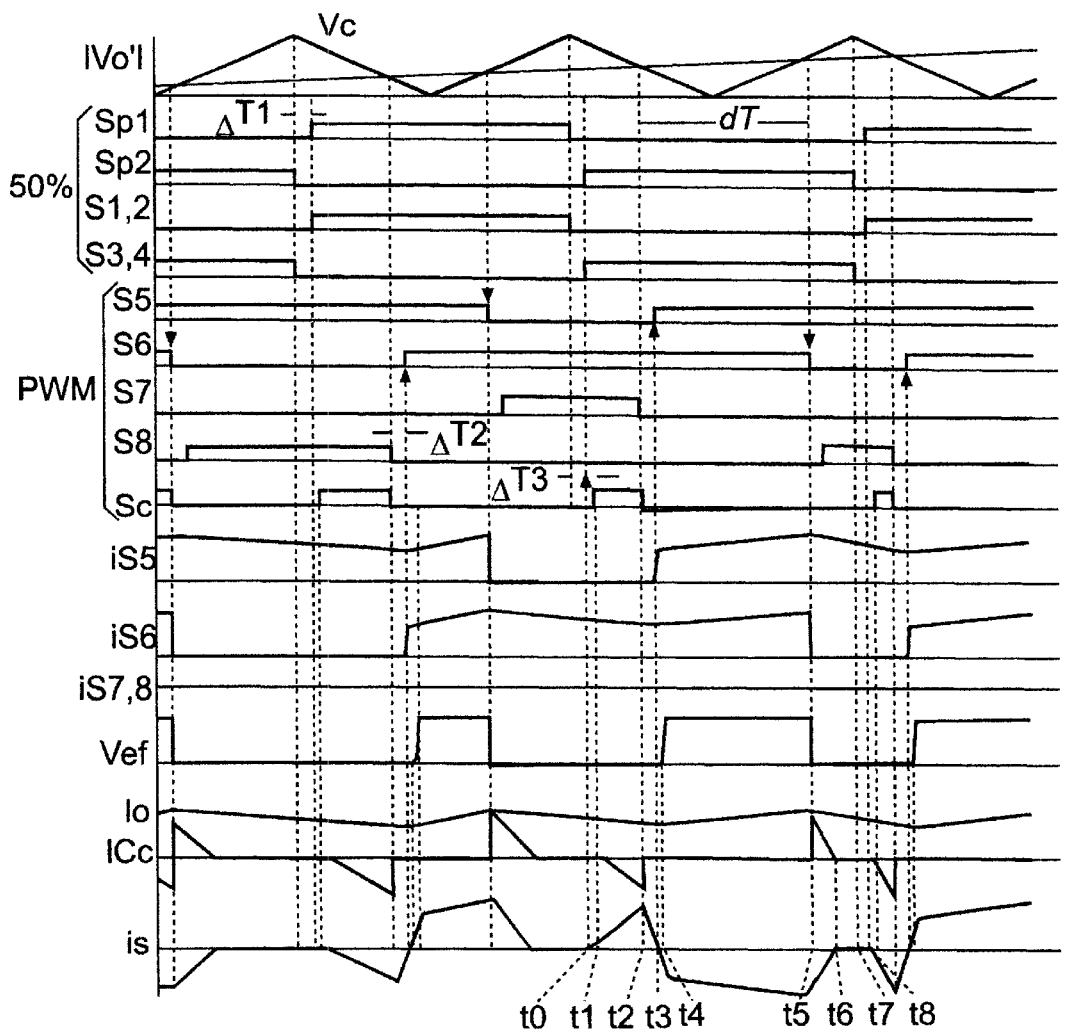
FIG. 9 is a timing diagram showing an alternative PWM pattern in quadrant I.

FIG. 9 shows another PWM pattern for operation in quadrant I. Actually the only difference from the previous one is that the clamp switch $S_C$ is activated at the beginning of a carrier cycle while all the control pulses for the main switches are kept exactly the same. In this case, during the latter half of the load current freewheeling interval, a reverse current can be built up in the transformer leakage inductance, and that energy is used to discharge the bus voltage down to zero and create the ZVS condition for the bridge II switches before their turn-on. With this pattern, the leakage energy is very easy to reset and lossless commutation for primary side and bridge I can always be ensured. The only shortcoming with this scheme is that during the on duty cycle, because the clamp switch is off and $C_C$ holds a voltage higher than the reflected source voltage, parasitic ringing on the bus can happen in practice.

Quadrant II: Rectification or Boost Operation

Figure 10:
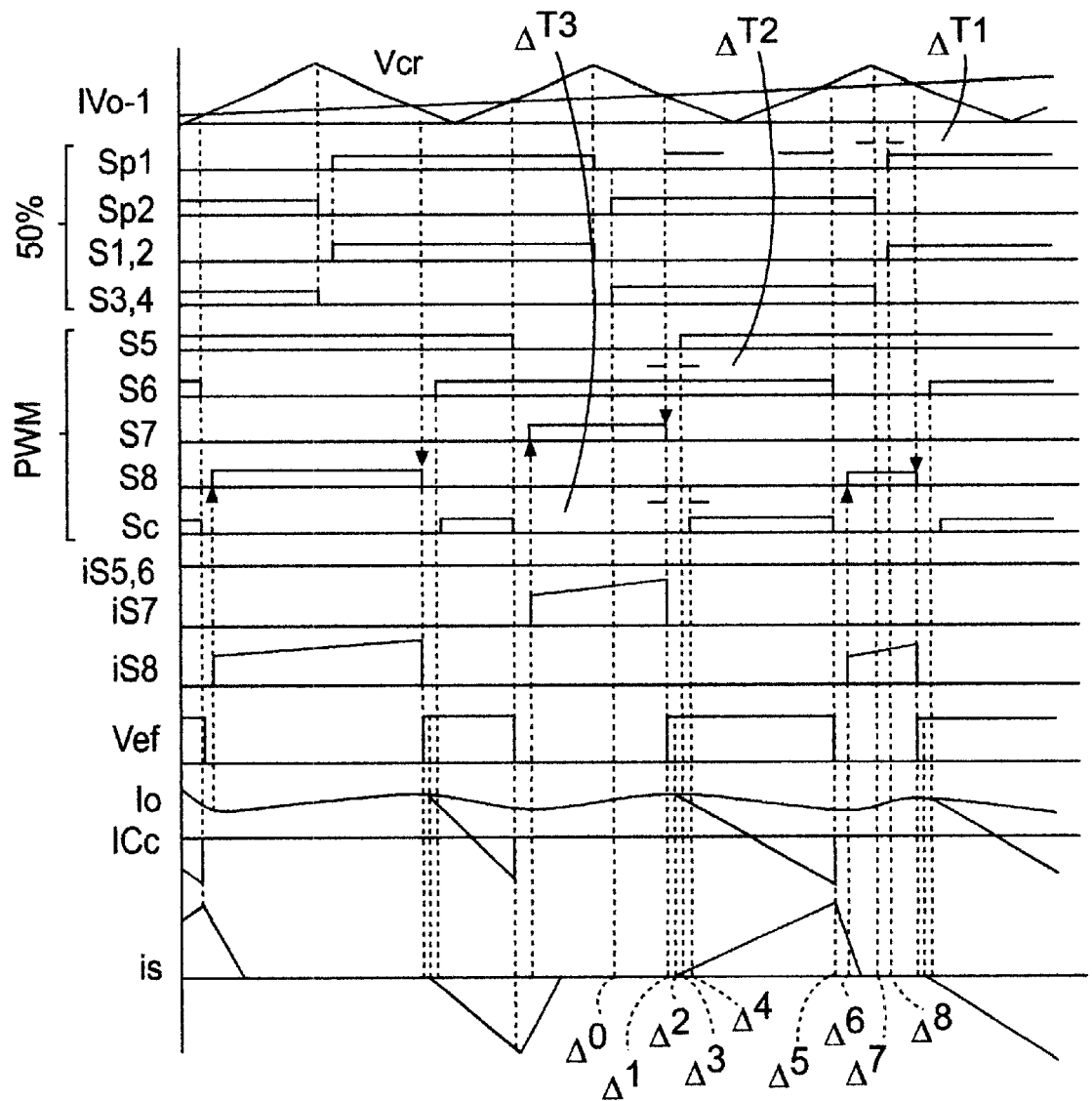
FIG. 10 PWM pattern and key waveforms in quadrant II.

In quadrant II, the synthesized output voltage is positive, but output current is actually negative. This means that the circuit actually operates as an isolated boost converter, and power is transferred back to the battery. The operation is similar to that in rectifier (charger) mode. The PWM pattern and high-frequency waveforms are shown in FIG. 10, while the equivalent circuits in each interval are shown in FIGS. 11A–H. It is clear that the PWM pattern is exactly same as shown in FIG. 7 for operation in quadrant I.

Charger Mode Operation—Rectification with PFC (Power Factor Correction)

Referring to FIG. 5, taken with FIG. 12 the operation of the present invention in charger mode will be described.

Time [t0–t1] is the same as in quadrant I, the primary side 60 and bridge I 56 conduct lossless commutation at the beginning of a carrier cycle. The load current freewheels at bridge II 58.

At time [t1–t2], $S_7$ is turned off at $t_1$, interrupting the freewheeling path. $I_O$ charges up the bus capacitance rapidly.

At time [$t_2$–$t_3$], at $t_2$, the bus voltage reaches $V_{Cc}$, and $C_c$ is automatically engaged to clamp the bus voltage. The resonance between $C_c$ and $L_k$ makes $I_s$ increase and energy is transferred to the dc side.

At time [$t_3$–$t_4$], $S_c$ is turned on under zero voltage at $t_3$, and $I_{Cc}$ reverses direction later. The behavior of the circuit is exactly the same as other isolated boost converters with an active clamp branch.

At time [$t_4$–$t_5$], $S_c$ is gated off at $t_4$, the difference between $I_s$ And $I_o$ is used to discharge the bus voltage down to zero.

At time [$t_5$–$t_6$], $S_8$ turns on under ZVS at $t_5$, and the output inductor is charged by the load voltage $V_o$. Meanwhile, $I_s$ continues to be reset by the dc source voltage.

At time [$t_6$–$t_7$], $t_7$, is completely reset at $t_6$ and kept quiescent.

At time [$t_7$–$t_8$], at $t_7$, the primary side and bridge I start to commutate with $S_{p2}$, $S_3$ and $S_4$ turned off under zero current. At $t_8$, the other half switching cycle is initiated with the complimentary switches being active.

It is clear from the foregoing analysis that the proposed center-aligned PWM scheme retains its basic pattern for four quadrant operations. When quadrant change happens, the circuit waveforms will assume different shapes under the same set of gate control signals. This invariant property is essential to simplify the control implementation and maintain highly reliable converter operation.

As indicated above, when operated in charger mode, the circuit realizes rectification of ac voltage with PFC, and operates only in quadrants II and IV. Theoretically, the same PWM pattern as in quadrant II presented above can be adopted. The only difference is that in this case, the control voltage is derived from a temperate generated from and synchronized with the available ac voltage. However, practically, the bi-directional, four quadrant nature of the PWM pattern above may potentially leads to loss of control around the zero crossing area within an ac line cycle. The problem can certainly be solved by careful control circuitry design. However, one simple solution is to use a slightly modified PWM pattern for charger operation, which limits bridge II to operation only in two quadrants.

Figure 12:
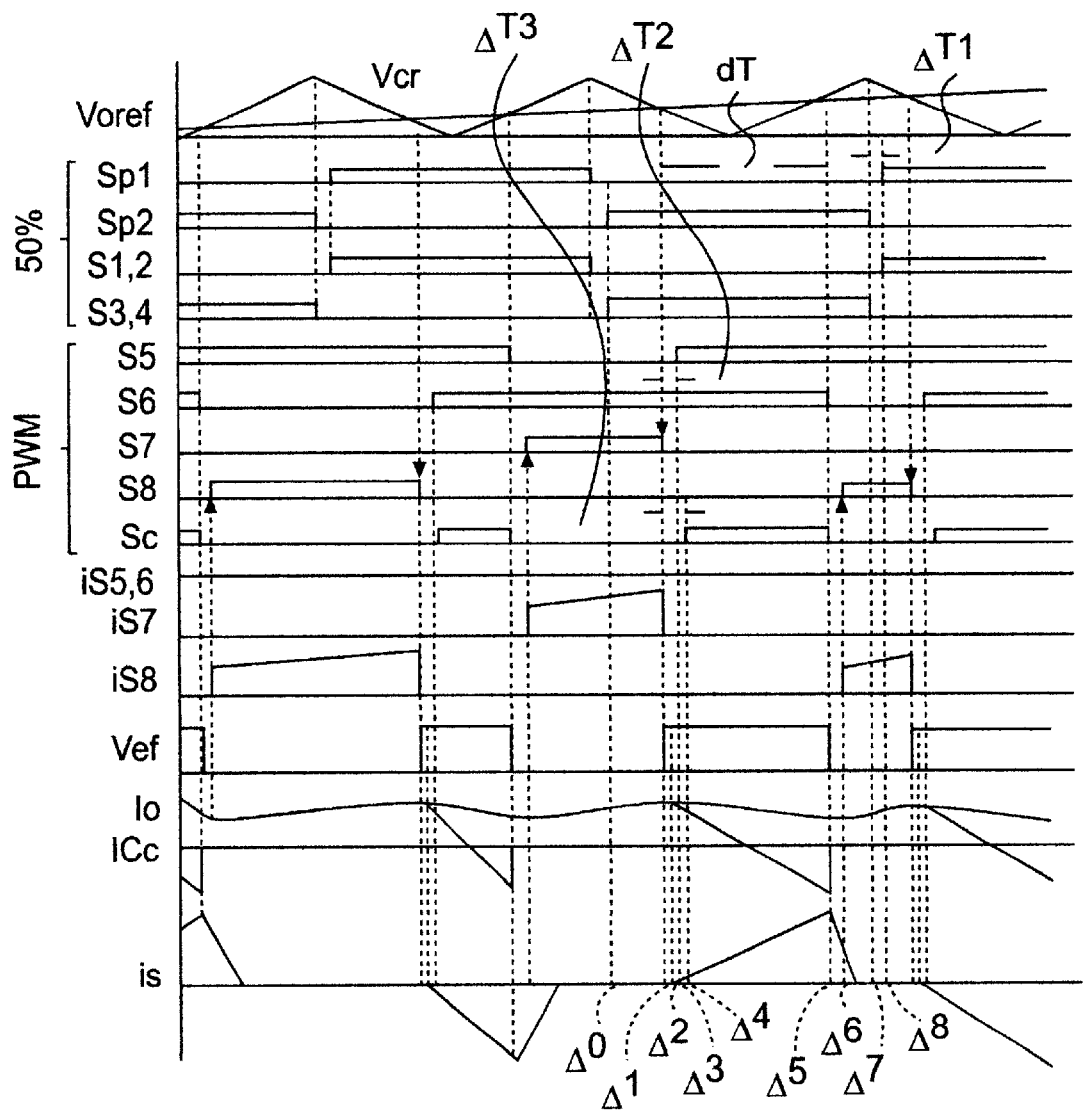
FIG. 12 is a timing diagram of a PWM pattern in PFC rectifier mode.

The resultant PWM pattern is shown in FIG. 12. Compared to the pattern for quadrant II in FIG. 10, it is revealed that the only modification made is that the control signals for $S_5$ and $S_8$ are shortened and the upper switches and lower switches are triggered by the same pulses respectively. With this modification, switches in bridge II are all off during the discharging interval of the output inductor, i.e., form $t_1$ thorough $t_4+\Delta T_2$, and bridge II is basically degenerated into a diode rectifier bridge. As a result, energy in the output inductor can only be dumped to the dc side, the output inductor is ensured to get proper reset and unwanted digression into operation in quadrants I and III is avoided.

Besides the discussed issue above, all the circuit behavior is the same as that of inverter operation in quadrant II, and the equivalent circuits shown in FIGS. 11A–H are also valid except that from $t_1$ thorough $t_4+\Delta T_2$, $S_5$ and $S_6$ in bridge II stay off. So no further concentration on the topic is necessary.

Finally, it should be mentioned that for operation in quadrant II and IV in both inverter and charger modes, power is transferred to the dc side, so the push-pull switches $S_{p1}$ and $S_{p2}$ need to function only as diode. If activated as discussed above, they operate as synchronous rectifiers which can help to reduce the conduction loss on the primary side. However, during $t_6$ through $t_1$ in the next half switching cycle, the circuit composed of the primary side and bridge I basically works as a bi-directional dc/dc converter running in discontinuous current mode (DCM). As a result, parasitic oscillation between the leakage inductance of the transformer and the parasitic loss, is inevitable. One easy way to suppress it is simply to disable the push-pull switches. This modifies the otherwise bi-directional dc/dc converter into a unidirectional one, and most of the parasitic ringing paths are blocked.

Synthesis of PWM Patterns

Figure 13:
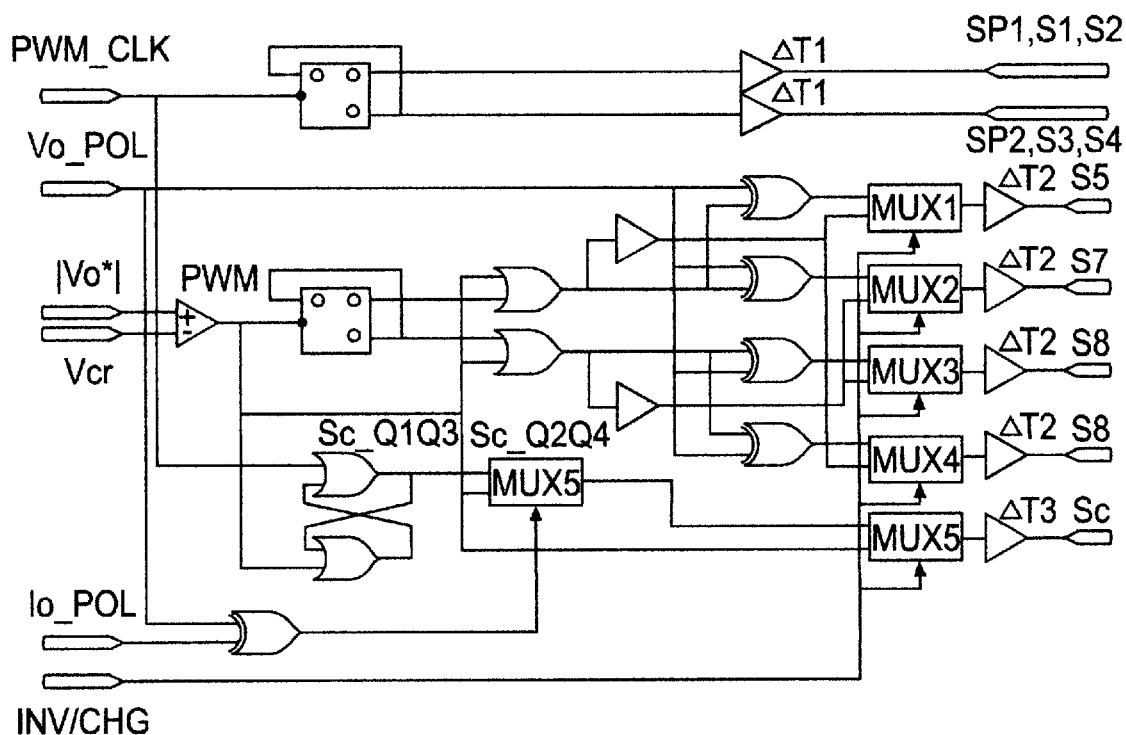
FIG. 13 is a circuit diagram for a circuit for synthesis of PWM signals.

The PWM patterns for all the main switches are invariant for operation in the four quadrants in inverter mode, so they can be synthesized with simply circuitry. As shown in FIG. 13, the 50% duty-cycles for the switches in the primary side and bridge I are directly obtained by dividing the PWM clock signal, PWM_CLK, with proper delay of $\Delta T_1$ inserted between the complimentary switch pairs.

A unipolar PWM modulator compares the rectified output voltage command |Vo*|($V_{ref}$ in charger mode) with the triangular carrier to obtain the basic PWM signal, PWM. All the driving signals for $S_c$ and bridge II switches $S_5$ thorough $S_8$ are generated with some logic manipulation of that signal. The output voltage polarity signal form the controller is used to direct the two long and two short driving signals, as shown in FIGS. 7, 9 and 10, to the diagonal switch pairs $S_5$ and $S_6$, and $S_7$ and $S_8$ in inverter mode. In quadrants I and II where output voltage reference is positive and $V_{o\_pol}=1$, the long pulse pair is directed to $S_5$ and $S_6$, and the short pulse paid to $S_7$ and $S_8$; in quadrants II and IV where $V_{o\_pol}=0$, they are reversed.

The PWM signals for inverter and charger modes are multiplexed by the mode control signal INV/CHG, and directed to the respective switches. If the PWM pattern shown in FIG. 9 is used in quadrants I and III, the control signal for $S_c$, $S_{c\_Q1Q3}$, needs to be generated with the R-S trigger as shown, and the inductor current polarity signal, $I_{o\_pol}$ is use to select the appropriate one to use between $S_{c\_Q1Q3}$ $S_{c\_Q2Q4}$ which is the same as PWM. Otherwise, if the PWM pattern in FIG. 7 is adopted, the position for Sc is invariant for all the bi-directional operating modes, and $MUX_5$ and $MUX_6$ can be eliminated and the inductor current polarity information is not needed.

System Control

Figure 14:
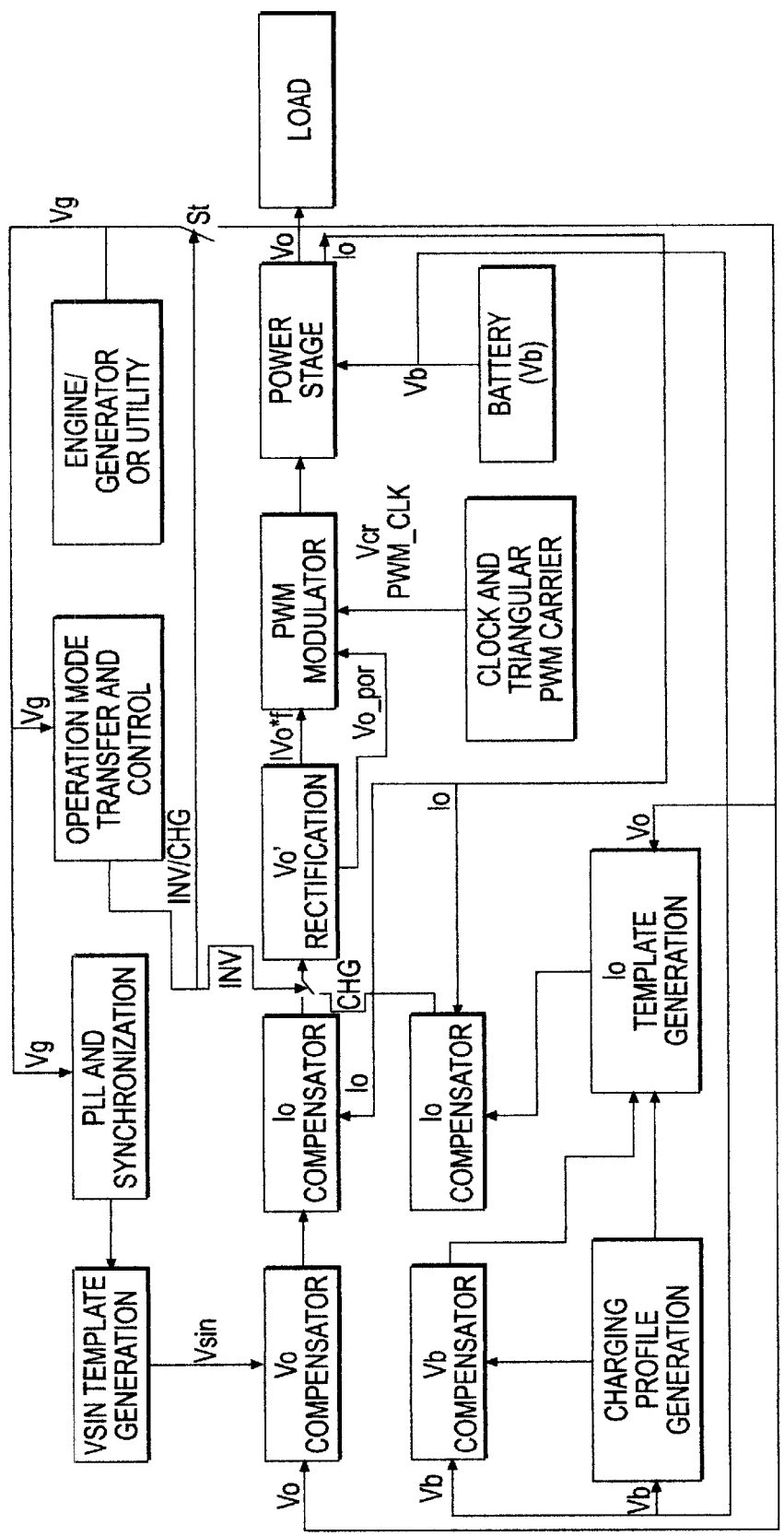
FIG. 14 is a block diagram of the system control functions.

The block diagram of the system control functions necessary for bi-directional power flow control and regulation is shown in FIG. 14. The operation mode transfer and control block is responsible for deciding which mode to operate by sensing the availability of an external ac source, $V_g$, or according to the external or remote command. If $V_g$ is not available, the transfer switch $S_t$ is open, and the mode control switch is set to INV position, or INV/CHG=1. In this case, the output ac voltage command $V_o$ is given out by the output of the cascaded output voltage and inductor feedback loops. The output voltage reference is generated from a sinusoidal template, $V_{sin}$, which is always trying to be synchronized with $V_6$, if any, typically with the help of a phase lock loop (PLL), Vo is rectified and both its amplitude and polarity, $V_{o\_pol}$, are fed to the unipolar PWM modulator. |Vo| is then compared with the triangular carrier to generate the PWM patterns as discussed above. The bandwidth of the output voltage and current control loops should be designed to be as high as possible to achieve good load regulation and dynamic response, especially under nonlinear load.

Once $V_g$ is present, and switching to charger mode is desired, INV/CHG=0, the control signal fed to the PWM modulator, denoted before as $V_{oref}$, is instead derived from the battery voltage and output inductor current feedback loops in the same way as in regular boost-based PFC rectifier. Certainly, more refined charging scenarios, such as three-stage charging, can be incorporated with the extra charging profile generation block which can override the usually slow battery voltage feedback compensator from time to time.

Extension of the QSS Topology

Figure 15A:
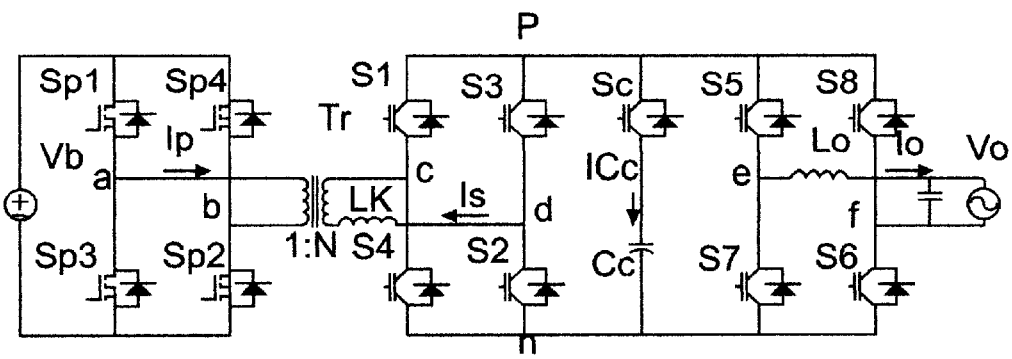
FIGS. 15A–C are examples of alternate embodiments of the QSS bi-directional inverters/chargers.
Figure 15B:
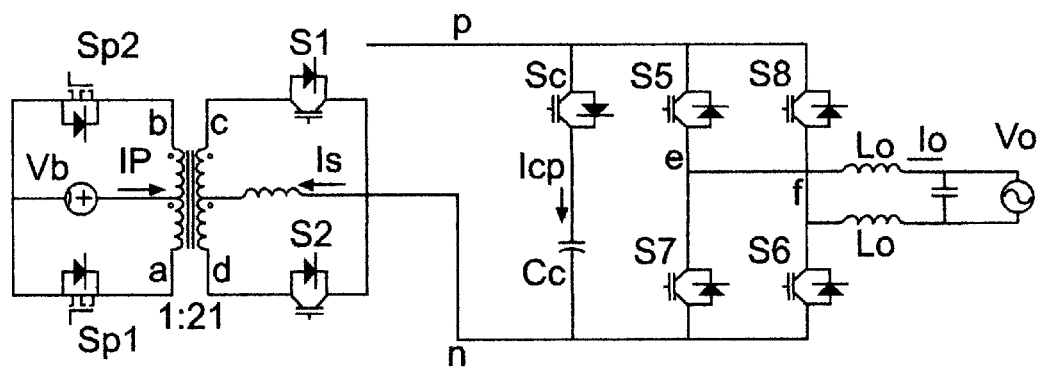
Figure 15C:
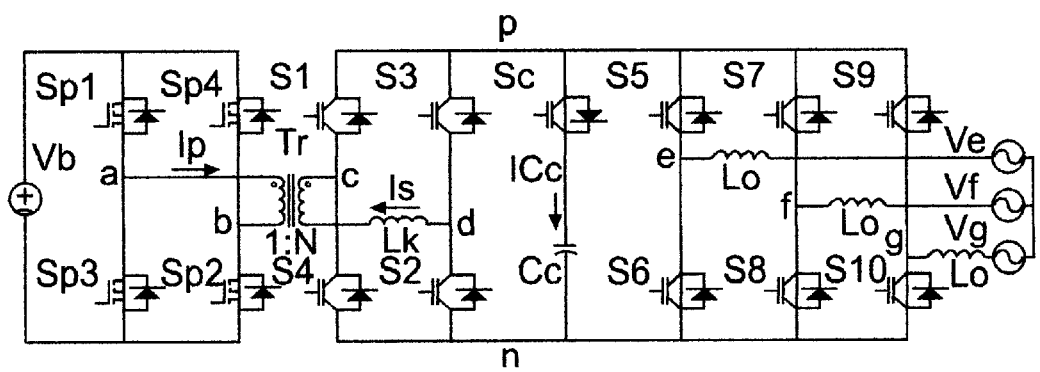

The analysis thus far has been limited to the QSS single-phase inverter/charger with a push-pull circuit on the input dc side. However the QSS bi-directional inverter/charger topology is more general. In fact it can be easily extended to include circuits, for example, with a voltage-fed full-bridge on the dc side, a push-pull circuit for the first bridge on the secondary, or with a three-phase output bridge (bridge II), as shown in FIGS. 15A–C, respectively.

The full-bridge QSS converter possesses two important traits different form its push-pull counterpart. First, primary device voltage is automatically clamped to the input voltage; second, zero transformer excitation can be created by switching the primary full-bridge. As a result, it is possible to shift some of the PWM functions to the primary bridge without concerns about transient voltage on the primary side or incurring high circulation loss. In fact, it is very beneficial for inverter operation in quadrants I and III when power is delivered to the output, and the power transferring path can be easily interrupted by switching the fast primary switches, usually implemented with MOSFETs. This results in the shifting of switching losses otherwise happening in the output bridge (bridge II) to the dc side, and the total switching loss is further reduced.

The three-phase QSS inverter/charger requires only five half-bridge configured switches, compared to 12 discrete switches mandated by the cycloconverter/based topology. Furthermore, all the other advantages of the QSS topology are retained.

Figure 16A:
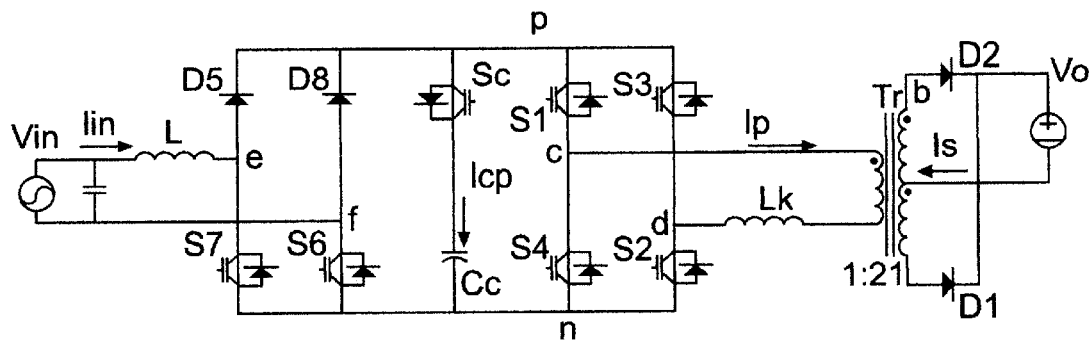
FIGS. 16A–C are examples of unidirectional QSS boost rectifiers.
Figure 16B:
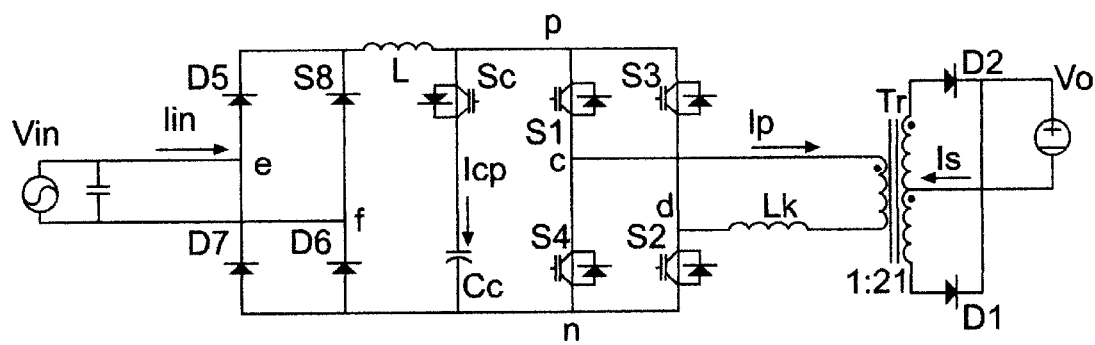
Figure 16C:
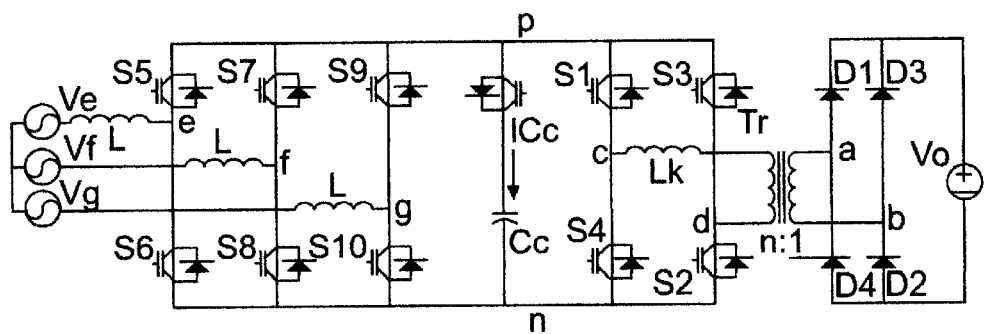

In case where only unidirectional PFC rectifier operation is needed, the QSS structure and its operation can be simplified. The dc side switches can be eliminated and replaced by diodes. In single-phase case, only two switches are needed for bridge II, as shown in FIG. 16A, while bridge I still works with zero current switching (ZCS). Actually, in this occasion, the topology can further be simplified into a diode rectifier bridge followed by a full-bridge with an active clamp branch, as shown in FIG. 16B. As the result of this change, bridge I needs to switch the current to shape the input current. In three-phase case, in order to shape the three-phase currents, the ac side bridges could not be simplified, as shown in FIG. 16C. But in both single-phase and three-phase rectifier cases, only single-sided PWM and corresponding saw-tooth carrier(s) are necessary. Because the operation of these extended topologies are either similar to or simpler than that of the QSS bi-directional single-phase inverter/charger, further detailed description of their operation principles will not be pursued here.

While the invention has been described in terms of a single preferred embodiment, those skilled in the art will recognize that the invention can be practiced with modification within the spirit and scope of the appended claims.

We claim:

1. A bi-directional inverter/charger for converting AC-DC and DC-AC, comprising:
    a direct current (DC) side;
    an alternating current (AC) side;
    an isolation transformer connecting said DC side and said AC side;
    said DC side comprising:
        a DC element connected to a primary side center tap of said isolation transformer; and
        a pair of switches each connected at a first end to said DC element and connected at a second end to end taps of said isolation transformer;
    said AC side comprising:
        a first bridge comprising a first plurality of switches connected to a secondary side of said isolation transformer;
        a second bridge comprising a second plurality of switches connected to an AC element; and
        a voltage clamp connected between said first bridge and said second bridge.

2. A bi-directional inverter/charger for converting AC-DC and DC-AC as recited in claim 1 wherein said voltage clamp comprises a switch connected in series with a storage element.

3. A bi-directional inverter/charger for converting AC-DC and DC-AC as recited in claim 2 wherein said storage element comprises a capacitor.

4. A bi-directional inverter/charger for converting AC-DC and DC-AC as recited in claim 2 wherein said switch comprises an anti-parallel diode.

5. A bi-directional inverter/charger for converting AC-DC and DC-AC as recited in claim 1 further comprising:
    filter means connecting said second bridge to said AC element, for smoothing a high frequency switching voltage ripple.

6. A bi-directional inverter/charger for converting AC-DC and DC-AC as recited in claim 2 further comprising a pulse width modulation (PWM) controller for controlling an opening and closing of said pair of switches, said first plurality of switches in said first bridge, said second plurality of switches in said second bridge and said switch in said voltage clamp.

7. A bi-directional inverter/charger for converting AC-DC and DC-AC as recited in claim 6 wherein said PWM controller controls an opening and closing of said a first plurality of switches in said first bridge and said pair of switches in said DC side at a 50% duty cycle.

8. A soft-switched single-phase quasi-single-stage (QSS) bi-directional inverter/charger having a direct current (DC) side and an alternating current (AC) side, said inverter/charger comprising:
    a push-pull inverter/rectifier comprising a DC element on said DC side;
    a transformer;
    a first bridge on said AC side connected to said push-pull inverter/rectifier through said transformer, said first bridge connected between first and second unidirectional buses;
    a voltage clamp circuit connected between said first and second unidirectional buses;
    a second bridge connected between said first and second unidirectional buses;
    an AC element connected to said second bridge; and
    a pulse width modulation (PWM) controller for controlling switching times of switches in said DC side and said AC side for causing in a first mode DC power from said DC element to be converted to AC power and, in a second mode for causing AC power from said AC element to be converted to DC power.

9. A soft-switched single-phase quasi-single-stage (QSS) bi-directional inverter/charger as recited in claim 8 wherein said dc element is an energy storage element.

10. A soft-switched single-phase quasi-single-stage (QSS) bi-directional inverter/charger as recited in claim 9 wherein in said second mode, AC power from said AC element is converted to DC power to recharge said energy storage element.

11. A soft-switched single-phase quasi-single-stage (QSS) bi-directional inverter/charger as recited in claim 8 wherein said PWM controller controls switches in said a push-pull inverter/rectifier and in said first bridge at approximately a 50% duty cycle.

12. A soft-switched single-phase quasi-single-stage (QSS) bi-directional inverter/charger as recited in claim 8 wherein said clamp circuit comprises a switch with an antiparallel diode connected in series with a capacitor between said first and second unidirectional buses.

13. A soft-switched single-phase quasi-single-stage (QSS) bi-directional inverter/charger as recited in claim 8 further comprising a filter means for connecting said second bridge to said AC element.

* * * * *